April 22, 1947. G. J. VAN LENNEP 2,419,381
IMPLEMENT FOR REMOVAL OF ICE CUBES FROM TRAYS
Filed March 2, 1945 2 Sheets-Sheet 1
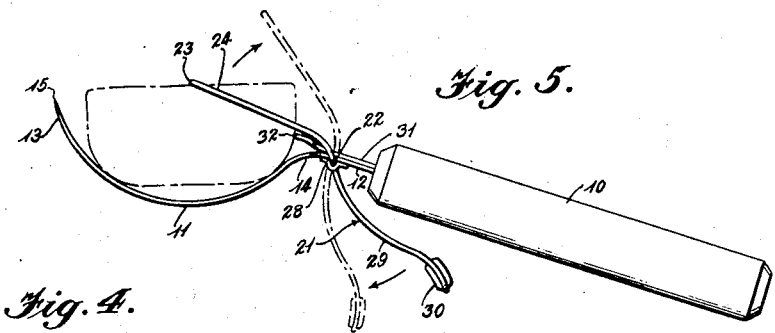
Fig. 5.
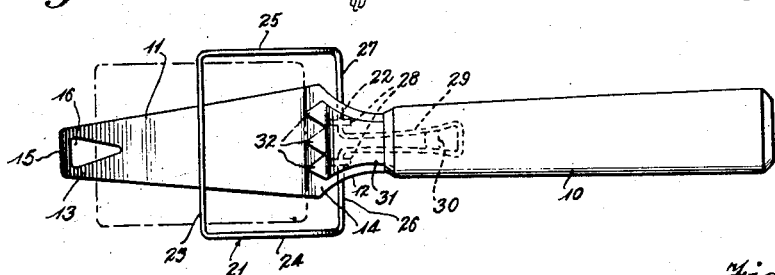
Fig. 4.
Fig. 3.
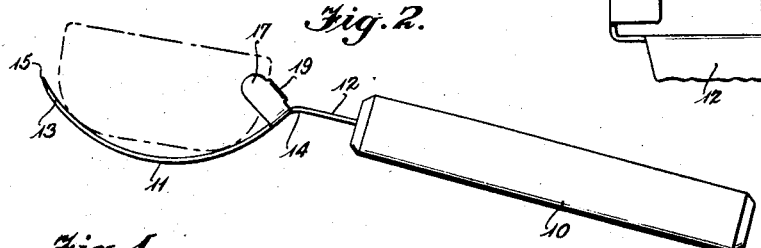
Fig. 2.
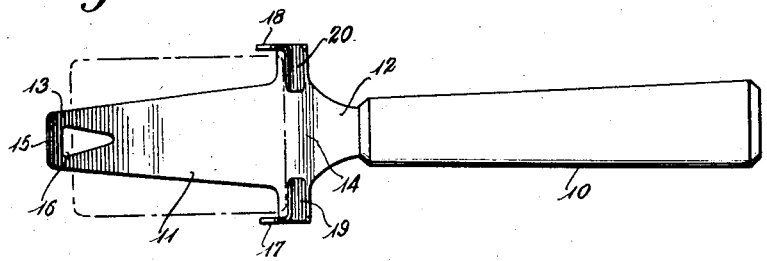
Fig. 1.
Inventor
Gustav J. van Lennep
By Jewett and Mead
Attorneys April 22, 1947.  G. J. VAN LENNEP  2,419,381
IMPLEMENT FOR REMOVAL OF ICE CUBES FROM TRAYS
Filed March 2, 1945  2 Sheets-Sheet 2
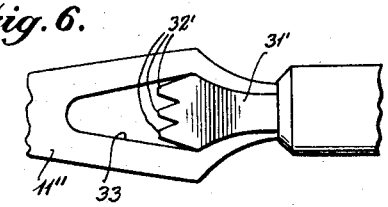
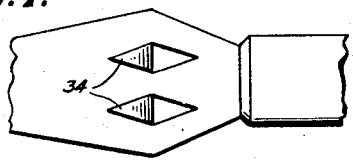
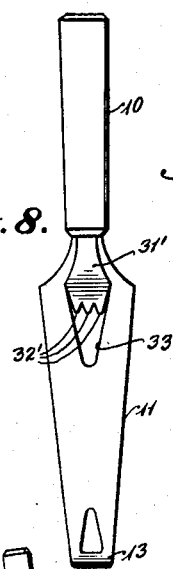
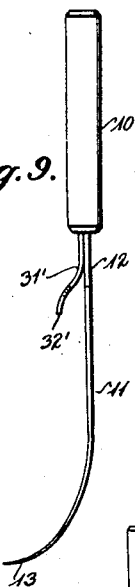
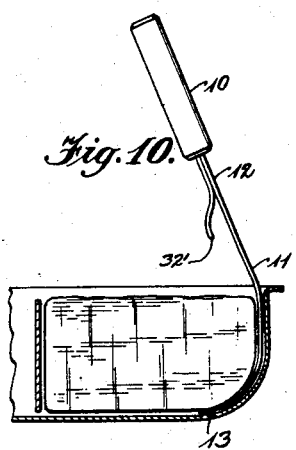
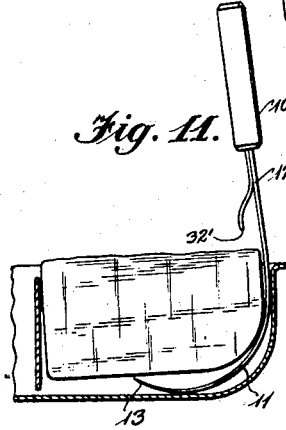
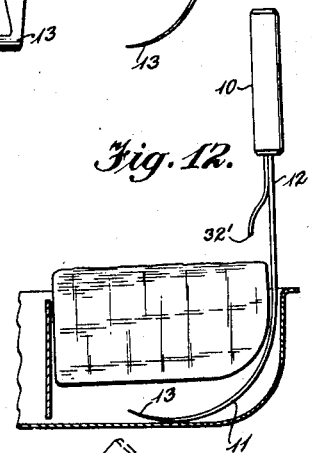
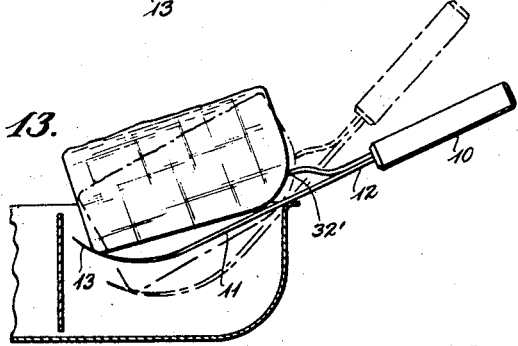
Inventor
Gustav J. van Lennep
By Jewett and Murad
Attorney Patented Apr. 22, 1947

2,419,381

UNITED STATES PATENT OFFICE 2,419,381

IMPLEMENT FOR REMOVAL OF ICE CUBES FROM TRAYS

Gustav J. van Lennep, Washington, D. C.

Application March 2, 1945, Serial No. 580,695

7 Claims. (Cl. 294—1)

1

The invention relates to refrigeration and has as an object the provision of an instrument for removing ice cubes from refrigerator trays.

It is an object of the invention to provide a method applicable in various ways to the removal of ice cubes.

It is a further object of the invention to provide an instrument for carrying out of the method.

It is a further object to provide an implement that may be used to remove a single cube from a tray preferably after slight defrosting.

It is a further object to provide an implement for removing cubes, also useful in the handling or carrying of the ice cube from the tray to a receptacle, as for instance a glass of beverage, without touching the cube with the fingers.

Further objects will appear from the following description when read in connection with the accompanying drawings showing illustrative embodiments of instruments for carrying out the method and illustrating the steps of the method in which drawings—

Figure 1 is a plan view of one form of instrument with an ice cube shown in dotted lines thereon.

Fig. 2 is a side elevation of the showing of Fig. 1.

Fig. 3 is a detail elevation of a portion of the structure of Figs. 1 and 2 drawn to an enlarged scale.

Fig. 4 is a plan view of a different form of instrument.

Fig. 5 is a side elevation of Fig. 4.

Fig. 6 is a detail plan view of a still further form of instrument.

Fig. 7 is a like view of a still further form.

Fig. 8 is a plan view of the complete instrument of the form shown in Fig. 6.

Fig. 9 is a side elevation of the structure of Fig. 8.

Figs. 10 to 13 inclusive are detail transverse sections of a portion of a tray showing one ice cube and the various steps in the method of the invention when utilizing the instrument of the invention to carry out the method.

The usual procedure in removing ice cubes from trays in which the ice is frozen in domestic refrigerators is both wasteful of ice and insanitary, particularly where but one or two cubes are wanted at a time. There are many devices shown in prior patents for solving the problem but in every case known to applicant the proposal includes either the removal of all the cubes with first defrosting of the tray or includes the provision

2 of a special form of tray, and in most cases involves some device providing rather complicated leverage apparatus for the purpose.

As shown on Figs. 1 to 3 inclusive, the device and method contemplated comprises a handle 10, a blade 11, comprising a tang portion 12 and a tip portion 13. As indicated in Figs. 2 and 5, the blade is formed at an angle 14 to the tang 12. This angle is eliminated at Fig. 8. The extremity of the tip portion at 15 is made up on a straight line to prevent said tip digging into the material of the tray when made of soft metal such as aluminum as is usually the practice at present and also to make bending easier at this end.

The corner surfaces of this extremity should also be well smoothed to further reduce liability of digging into the metal. In order to carry out the method of the invention, the degree of resilience, flexibility and stiffness of the various portions of the blade 11 are important. Adjacent the tip 13 the blade must be sufficiently flexible as to be able to follow the curve of the bottom of an ice tray in the manner shown in Fig. 10.

In the process of operation and procedure of the method, this device is operated in the following manner: As shown in Fig. 10, the blade of the implement is held at such an angle that the curve of the blade toward its end 13 will be initially roughly in alignment with the side of the tray. It is then pushed lengthwise of the blade causing the same to follow downward between the ice tray and the ice cube and to follow the curve between the bottom and the side of the tray. By virtue of continued pressure on the instrument toward the bottom of the tray when said instrument has loosened the ice cube to the position shown in Fig. 11, the resilience of the instrument seeking to regain its normal form of Figs. 9 and 13, causes said instrument, through reacting resilience, to press against the lower portion of the curved corner of the cube. The cube being ice is rigid and incompressible but very slippery, and the thus exerted wedging action causes said cube to spring upwardly and in its entire body to approximately the position shown in Fig. 12. Thus far in this operation no possible prying force has been exerted upon the instrument, but only a downward motion lengthwise upon the handle. When this position, as indicated in same Fig. 12, has been brought about, the handle of the instrument is moved into the position of Fig. 13 and with a further lengthwise movement of the instrument, the ice cube resting thereon and held against longitudinal slippage by the curved tip 13 of the implement may be carried about as desired.

For the efficient procedure of this method and operation of the device, the stiffness and resilience of the blade at substantially its midmost position (or portion) and extremity 13 must be carefully adjusted and the provision of these characteristics requires careful tempering of the blade. To increase the flexibility of the thin end 13 of the implement while retaining sufficient stiffness to enable the forcing thereof between the ice cube and the tray, an opening 16 is shown near said thin end of the blade. This opening although not essential nor critical as a practical means of increasing flexibility of this end is an essential provision for the purpose of stabilizing the ice cube upon the implement while in the process of handling and transporting the same. This provision is made clear through the fact that the instrument when used will be at a higher temperature than the ice cube and therefore when the cube rests upon the instrument, as indicated in Fig. 13, the metal of said instrument around the opening 16 will slightly melt the ice, forming a boss upon said ice cube resting in the opening, thereby tending to prevent lateral slippage of the same after leaving the tray and during the transporting of the same.

To assist further in such balancing there is shown in the form of Figs. 1 to 3 inclusive a pair of ears 17, 18 placed to project at each side of the cube as shown in Fig. 2, each ear bearing a fence portion 19, 20 to stand behind the cube to prevent its slippage toward the tang portion 12. As shown, the ears 17, 18 and the fence portions 19, 20 are struck up from the material of the blade 11. Since the blade 11 must be of carefully tempered steel it may be desirable to provide the ears and fence portions upon a separate piece of metal as shown in Fig. 3 which may overlie the tang 2 and be riveted thereto or it may be secured to the tang by folding portions of the addition about the tang.

In the form shown in Figs. 4 and 5, a clamp device 21 is shown pivoted at 22 upon the tang of the instrument and comprising a wire rectangle 23 having portions 24, 25 adapted to extend upon each side of the cube and portions 26, 27 pivoted as by means of straps 28 to the tang of the instrument and extended to a handle 29 beneath the handle 10 of the instrument. The handle 29 may be provided with a weight 30 or may be otherwise made to overbalance the loop 16 as by virtue of the length of the handle, for the purpose of getting the loop out of the way while inserting it to the position of Fig. 10. The loop 23—25 therefore acts not only as a clamp but also as side barriers to prevent slippage of the cube laterally.

In the form of Figs. 4 and 5 also a different form of fence is shown comprising a plate 31 overlying the tang and extended to teeth 32 which are adapted to melt their way slightly into the ice to prevent side slippage.

In the form of Fig. 6 a fence similar to that shown at 31 is shown at 31' having the teeth 32' and an opening 33 is formed by striking away material of the blade 11'. The provision of this opening has the function of assisting in preventing side slippage at the other end of the ice cube by melting away the ice to provide a boss after the manner described in connection with the opening 16.

As shown in Figs. 8 and 9, the blade of the instrument is made straight instead of being formed with the angle shown at 14 in Figs. 2 and 5. In the form of Fig. 7 fence members 34 are shown as struck from the material of the tang and bent over to project over the blade 11".

Minor changes may be made in the steps of the process or in the physical embodiment of the implement within the scope of the appended claims without departing from the spirit of the invention.

I claim:
1. An implement for removal of ice cubes from freezing receptacles comprising: a thin flat blade of flexible resilient material curved from the plane thereof at a tang portion to a free extremity; the flexibility of said blade uniformly increasing from said tang portion to said free extremity thereof and the flexibility thereof adjacent said extremity being sufficient to permit said extremity to follow the curve of the wall of a usual ice freezing receptacle.

2. The implement of claim 1 with the blade formed with an opening of substantial size adjacent said tang portion, whereby to thaw the ice at the edges of said opening and form a boss on the ice entering said opening to prevent slippage of ice relative to the implement.

3. In an implement of the class described: a thin flat flexible blade uniformly decreasing in thickness with consequent uniformly increasing flexibility from a tang portion to a free extremity thereof; said blade curved from the plane thereof at said tang portion on a curve of decreasing radius adjacent and to said free extremity.

4. The implement of claim 1 with a fence carried by the blade adjacent said tang portion to prevent slippage of an ice cube toward the tang portion.

5. The implement of claim 3 with a fence member carried by the blade adjacent said tang portion and with means to prevent slippage of a cube lying on the blade laterally in the plane of the blade.

6. The implement of claim 1 with the blade formed with at least two openings of substantial size; one of said openings adjacent the extremity of the blade; whereby melting of the body of an ice cube supported on the implement by contact between the ice and the portion of the blade adjacent said openings will form bosses entering said openings to prevent slippage of the cube relative to the blade.

7. The implement of claim 1 with a clamp member pivoted to a portion of the implement and formed with a portion to be actuated by fingers of a user to press an ice cube against said blade for carrying the cube upon the blade.

GUSTAV J. van LENNEP.

REFERENCES CITED

The following references are of record in the file of this patent:

UNITED STATES PATENTS

| Number | Name | Date |
| --- | --- | --- |
| 967,263 | Sweeting | Aug. 16, 1910 |
| 1,470,142 | Busch | Oct. 9, 1923 |
| 1,801,672 | Knowles | Apr. 21, 1931 |
| 1,948,592 | Nelson | Feb. 27, 1934 |
| 2,064,136 | Winger | Dec. 15, 1936 |
| 2,141,223 | Pistorius | Dec. 27, 1938 |